United States Patent

[11] 3,587,244

| [72] | Inventor | Charles P. Wood, Jr.<br>Cincinnati, Ohio |
|---|---|---|
| [21] | Appl. No. | 809,174 |
| [22] | Filed | Mar. 21, 1969 |
| [45] | Patented | June 28, 1971<br>Continuation-in-part of application Ser. No. 573;327, Aug. 18, 1966. |
| [73] | Assignee | Midwest Research &<br>Development Corp., Cincinnati, Ohio |

[54] THERMAL DIFFERENTIAL SENSOR FOR REFRIGERATION SYSTEMS
4 Claims, 15 Drawing Figs.

[52] U.S. Cl.................................................. 62/126,
62/219, 62/503, 73/295, 73/308, 73/313, 137/386
[51] Int. Cl....................................................F25b 49/00,
G01f 23/00
[50] Field of Search........................................... 62/218,
219; 137/386, 392; 73/292, 295, 308, 313; 62/126

[56] References Cited
UNITED STATES PATENTS

| 2,240,952 | 5/1941 | Hetzer.......................... | 137/412X |
| 2,244,348 | 6/1941 | Rickmeyer................... | 337/373X |
| 2,735,272 | 2/1956 | Lange........................... | 62/218 |
| 3,029,354 | 4/1962 | Watkins........................ | 137/386X |
| 3,461,907 | 8/1969 | Wood............................ | 137/386 |

Primary Examiner—Martin P. Schwadron
Assistant Examiner—P. D. Ferguson
Attorney—Wood, Herron and Evans ABSTRACT: A liquid level control device for a refrigeration system having a vessel in which liquid refrigerant is accumulated at a low temperature. The control device comprises a thermostat clamped in thermal contact about a telltale tube which communicates with the vessel, the thermostat having a temperature-responsive element providing rotary movement in response to the temperature of the liquid level within the telltale tube. The temperature-responsive element is mechanically connected to an electrical switch, preferably of the mercury type, which in turn, is in electrical connection with a control valve which regulates the supply of liquid refrigerant to the vessel so as to maintain a predetermined liquid level with the vessel. A heating element is interconnected in the circuit and arranged to heat the telltale tube in proximity to the thermostat to cause the thermostat to react promptly and accurately in response to temperature changes induced by the changing liquid level.

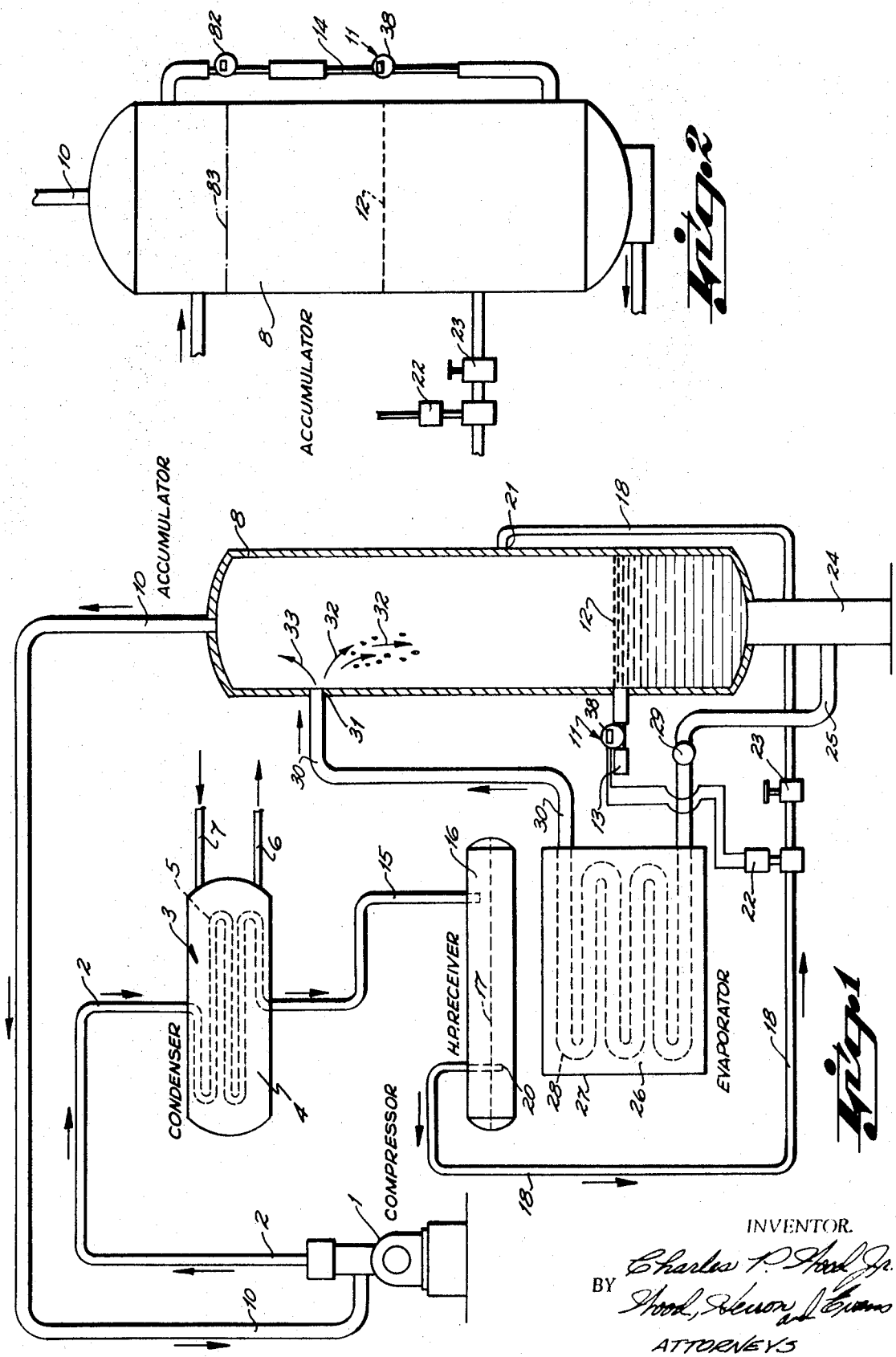

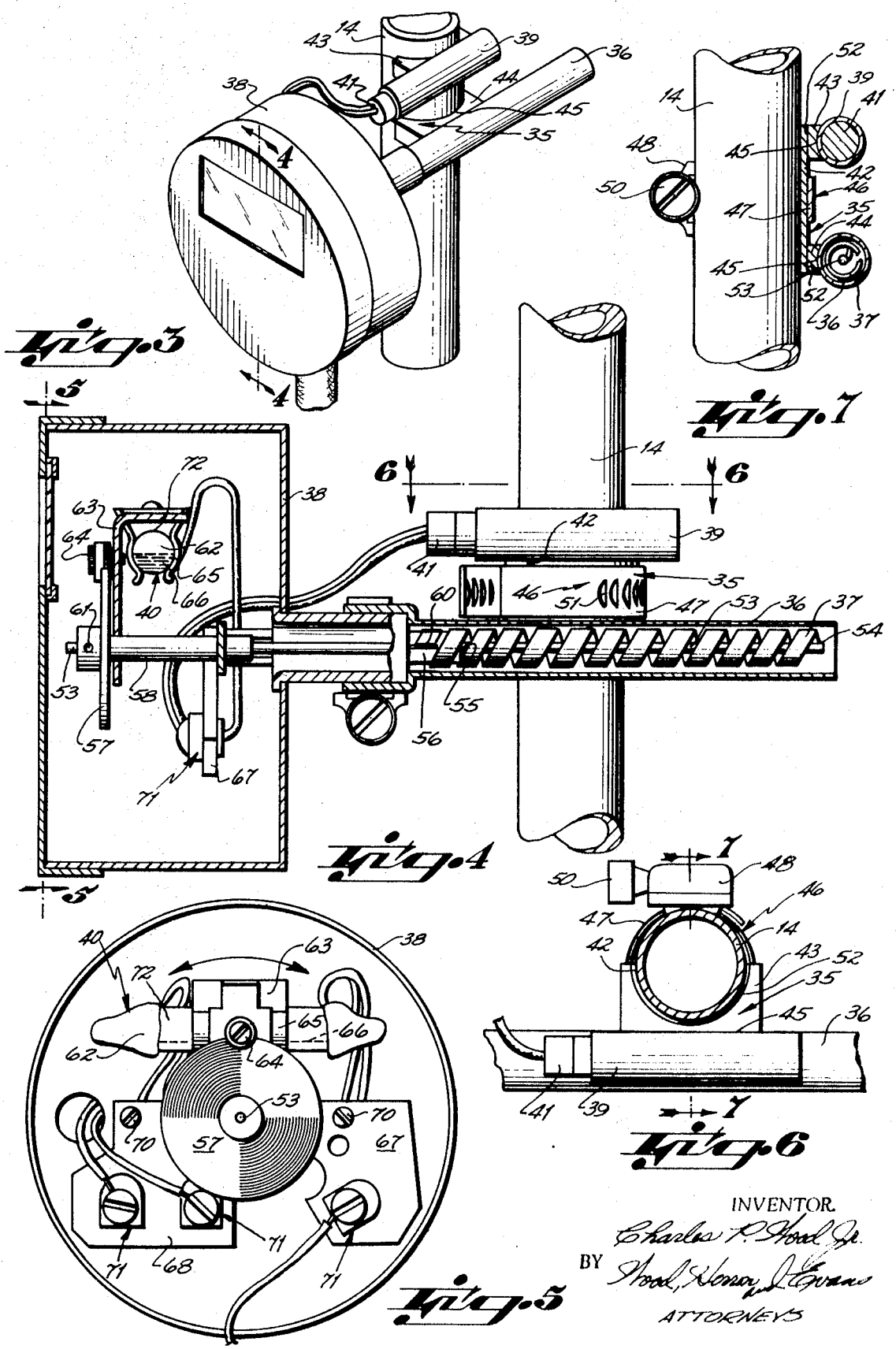

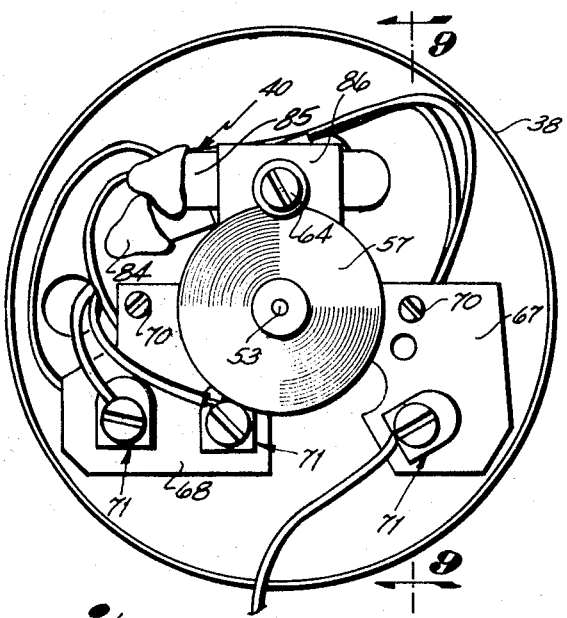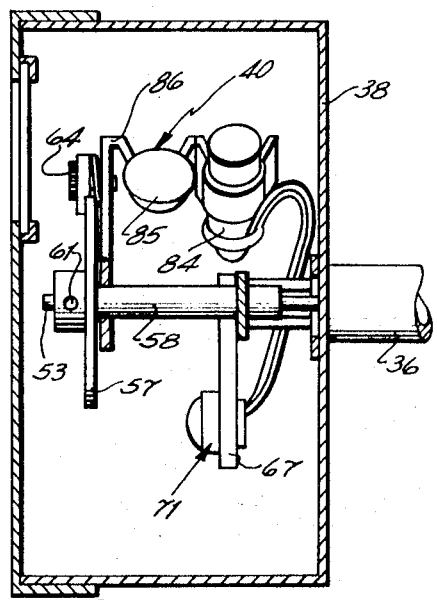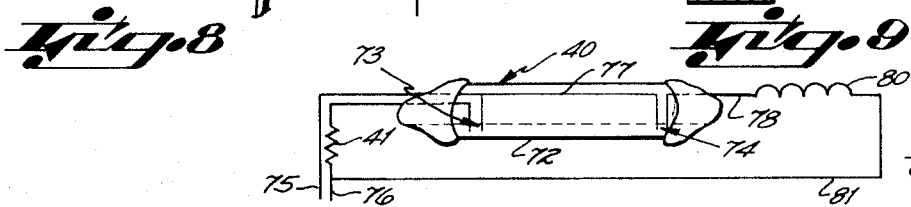
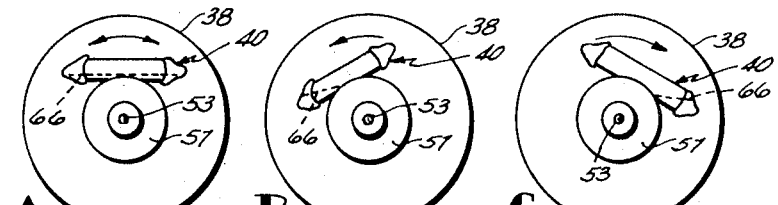
A  HEATER ENERGIZED
   SOLENOID ENERGIZED
   (VALVE OPEN)
B  HEATER ENERGIZED
   SOLENOID DEENERGIZED
   (VALVE CLOSED)
C  HEATER DEENERGIZED
   SOL. ENERGIZED
   (VALVE OPEN)
Fig. 11
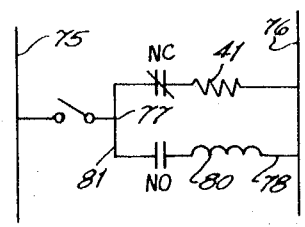
Fig. 12
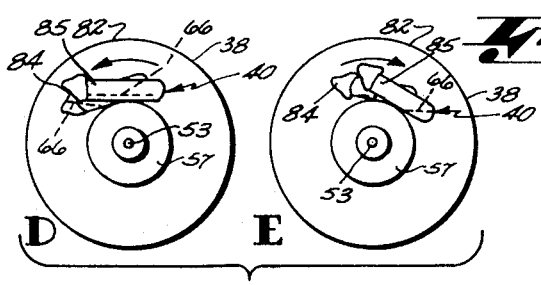
D    E
Fig. 13
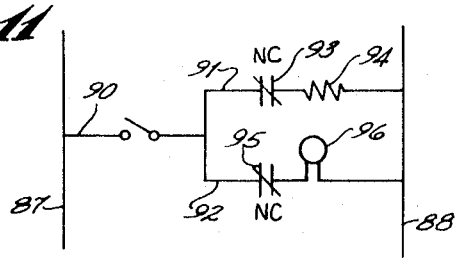
Fig. 14
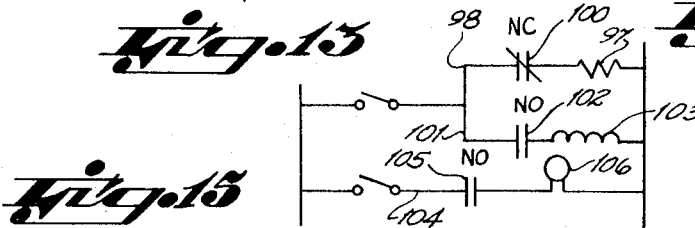
Fig. 15

3,587,244

1

THERMAL DIFFERENTIAL SENSOR FOR REFRIGERATION SYSTEMS

This application is a continuation-in-part of my copending application Ser. No. 573,327, filed on Aug. 18, 1966.

BACKGROUND OF THE INVENTION

This invention relates generally to liquid level control devices for refrigeration systems of the commercial type, for example, those which are employed in the refrigeration of meat packing plants, breweries and the like. The liquid level control device is intended for refrigeration systems which include a vessel, such as, an accumulator in which a predetermined liquid level is to be maintained.

The earlier application discloses and claims a liquid level control device which senses the temperature differential within a vessel in order to control the liquid level. The present application discloses a liquid level control device utilizing the same general principles, but with refinements by means of which the detection and control of the liquid level is carried out more rapidly and accurately.

One of the primary objectives of the invention has been to provide a liquid level control device which maintains the liquid level in a vessel by sensing the temperature differential above and below the liquid refrigerant within the vessel through the wall of the vessel or through a telltale tube or the like, without requiring the use of a probe, float valve or other element which ordinarily is installed through the wall of the vessel for this purpose.

According to the present invention, the control device detects or senses the liquid level within the vessel through conduction of heat which, in turn, triggers the liquid supply system to the vessel in response to an electrical impulse which is emitted by the liquid level device.

In carrying out the principles of the invention, there is provided a thermal conduction element in thermal contact with the telltale tube. The conduction element, preferably a tube, is mounted at a cutoff point at which the liquid level is to be maintained within the vessel. Within the conduction tube there is provided a thermostat formed of a bimetallic strip spirally wound and closely interfitting the conduction tube for thermal conduction.

One end of the spiral bimetallic thermostat strip projects into a switching housing which includes, in the present example, a mercury switch connected to the end portion of the spiral thermostat. The arrangement is such that, upon a change in temperature, the spiral thermostat rotates the mercury switch so as to open or close its contacts. The mercury switch is interconnected with a solenoid valve inserted in a refrigerant supply line leading to the vessel. The arrangement is such that the mercury switch controls the liquid level in response to rotary motion imparted to it by the spiral thermostat strip. Thus, when the liquid refrigerant drops below a predetermined level, then the spiral thermostat rotates the mercury switch in a direction to open the solenoid valve electrically so as to replenish the liquid refrigerant within the vessel.

It has been another object of the invention to provide a liquid level control device which is sensitive and reliable in operation and arranged to sense the difference between the liquid level and the superheated gas, thereby to respond quickly to relatively slight changes in the liquid level within the telltale tube of the vessel.

In accordance with this aspect of the invention, the liquid level device includes an electrical heating element in proximity to the conduction tube which speeds up recovery of temperature when liquid level drops below the thermal conduction tube. In other words, when the liquid level drops below the conduction tube, the warming effect of the electrical heating element causes the spiral thermostat to react promptly, thus tilting the mercury switch in a direction to open the solenoid valve, causing replenishment of the liquid refrigerant within the vessel.

2

A further objective of the invention has been to provide a liquid level control device which may be installed upon a vertical telltale tube, sight glass, or other convenient location to be adjusted vertically and thereby permit adjustment of the liquid refrigerant level to be maintained within the vessel according to the requirements of any individual refrigeration system.

In order to realize this aspect of the invention, the liquid level control device, which is a self-contained unit, includes an adjustable clamping device arranged to embrace the outside diameter of the telltale tube. Upon installation, or later adjustment, the assembly is shifted to the selected elevation and clamped in position. The heating element, above referred to, is also attached to the clamping device at a fixed spacing with reference to the conduction tube so as to be shifted with the conduction tube to the desired liquid level.

According to the present invention, the electrical heating element above referred to may be energized by the same mercury switch which operates the solenoid valve. According to this arrangement, the heating element may normally be energized during that period in which the liquid refrigerant is at the predetermined level, with the solenoid valve closed. When the level drops and the thermostat responds to replenish the supply of liquid, then the mercury switch deenergizes the heater to condition the conduction tube for quick response, as noted above.

As used throughout the specification and claims, the word "telltale tube" refers either to the vertical liquid level column having upper and lower ends communicating with the vessel or to a horizontal tube which has one end communicating with the interior of the vessel, the outer end being sealed off. In utilizing the horizontal telltale tube, the liquid level is determined by the elevation at which the tube is installed, whereas the vertical telltale tube permits the selective location of the control device, whereby the liquid level may be varied as outlined earlier.

From the foregoing, it will be recognized that the liquid level device of the invention may also be installed in a commercial refrigeration system to act as a high level alarm which is activated in the event that the level of the liquid refrigerant in the vessel reaches a point beyond the cutoff point. In its utility as a high level alarm, the control device may be installed either on the vertical telltale tube at a predetermined elevation, or it may be mounted on the horizontal telltale tube. It will be understood that the alarm is mounted at a higher elevation to respond independently of the liquid control device in the event that some failure occurs in the operation of the liquid control device.

The various features and advantages of the invention will be more clearly apparent to those skilled in the art from the following detailed description taken in conjunction with the drawings.

DRAWINGS

In the drawings:

FIG. 1 is a diagrammatic view of a typical refrigeration system including an accumulator vessel having a horizontal telltale tube, with the liquid level control device or thermal differential sensor in position for refulating the level of the liquid refrigerant within the accumulator.

FIG. 2 is a view of the accumulator, as illustrated in FIG. 1, with a vertical telltale tube communicating with the interior of the accumulator vessel, the liquid level control device being adjustably mounted upon the telltale tube to maintain the level of the liquid refrigerant at an adjusted cutoff point.

FIG. 3 is a perspective view of the assembled liquid level control device mounted in relation to the vertical telltale tube, similar to the installation shown in FIG. 2.

FIG. 4 is an enlarged sectional view of the preferred form of the liquid level control device as taken along the line 4—4 of FIG. 3.

FIG. 5 is a face view of the switch housing of the control device as viewed along the line 5—5 of FIG. 4, with the cover plate removed. This view depicts the mercury switch and its adjustment mechanism, with the switch shown in a neutral position.

FIG. 6 is a fragmentary sectional top view taken along the line 6–6 of FIG. 4, illustrating the adjustable clamping means by which the control device is adjustably clamped with reference to the vertical telltale tube.

FIG. 7 is a sectional view taken along the line 7–7 of FIG. 6, further detailing the clamping arrangement by means of which the thermal-responsive element and the heating element are adjustably clamped in thermal contact with the vertical telltale tube for adjustment in controlling the liquid level to be maintained within the accumulator vessel.

FIG. 8 is a face view, similar to FIG. 5 showing a modified version of the switch housing in which two mercury switches are adjustably mounted for rotary tilting movement by the sensing element of the thermostat and utilized in operating either a liquid feed valve, or a high level alarm in response to a liquid level within the accumulator above that which is normally required.

FIG. 9 is a sectional view taken along the line 9–9, further illustrating the construction of the switch box in which is mounted the mercury switches.

FIG. 10 is a diagrammatic view showing the mercury switch and its electrical contacts.

FIG. 11 illustrates in a diagrammatic manner, the tilting motions of the mercury switch in controlling the solenoid valve and heating element in response to thermal differential caused by variations in the liquid level.

FIG. 12 is an electrical diagram illustrating the circuit which is controlled by the mercury switch.

FIG. 13 depicts diagrammatically a modified arrangement in which the switch box is provided with two mercury switches, one of which controls the heater and the second of which controls an alarm device for indicating an abnormally high level within the accumulator.

FIG. 14 is a diagram showing the electrical circuit which is interconnected with the mercury switches of FIG. 13 to energize the high level alarm.

FIG. 15 is a diagrammatic view showing a modified electric circuit which may be utilized in connection with the high level alarm which is shown generally in FIG. 2.

DETAILED DESCRIPTION

Typical Refrigeration System

The refrigeration system, shown diagrammatically in FIG. 1, has been selected to illustrate the principles of the liquid level control device of the invention. It will be understood, of course, that the control device may be installed in any one of the various commercial refrigeration systems, whether a newly constructed system or an existing one. Moreover, the control device may be installed on any available conduit (preferably vertical) communicating with a vessel, such as an accumulator in which a liquid level is to be regulated and without requiring an internal connection or probe communicating with the interior of the vessel.

As explained in detail below, the liquid level in the vessel is maintained by thermal conduction or transfer of heat from the control device to the interior of the vessel or a telltale tube. The level or cutoff point may be adjusted simply by raising or lowering the control device with respect to the vertical telltale tube upon which it is externally clamped, or by the location of the horizontal telltale tube vertically.

Referring to FIG. 1, the refrigeration system illustrated represents a relatively simple commercial type, comprising in general, a conventional motor-driven compressor indicated at 1, connected by way of the pressure conduit 2 to a condenser indicated generally at 3, such that the compressed refrigerant gas is advanced from the compressor 1 to the condenser 3. In the present example, the condenser 1 essentially comprises a tank 4 enclosing a condenser coil which is indicated at 5.

Water or other coolant is circulated through the condenser tank 4 by way of the conduits 6 and 7. The direction of flow of the liquid coolant with reference to the tank 4 is indicated by the arrows. The direction of flow of the compressed refrigerant gas from the compressor 1 to the condenser coil 5 is also indicated by the arrows.

It will be understood that the refrigeration system illustrated depicts a typical arrangement in simplified form and that the components may vary from one installation to another. For example, the condenser 3, in place of being liquid cooled, as illustrated, may also be of the air-cooled type which involves the use of a blower providing an air blast stream.

The heat-laden refrigerant gas, usually ammonia, as in the present example, is supplied in the form of a gas to the compressor 1 from an accumulator 8 by way of a suction line 10 connecting the upper portion of the accumulator 8 to the compressor 1. The liquid control device or thermal differential sensor of the invention, indicated generally at 11, (FIGS. 1 and 2) and also in the detailed views, maintains the liquid level of refrigerant in the accumulator 8, at the liquid level indicated at 12 in FIG. 1. In the example illustrated in FIG. 1, the liquid level control device 11, is illustrated as being mounted upon a horizontal telltale tube 13 in FIG. 1 and upon a vertical telltale tube 14 in FIG. 2 arranged to sense the difference between the liquid level and the superheated gas above it.

In the vertical arrangement of FIG. 2, the upper and lower ends of the telltale tube 14 communicate directly with the interior of the accumulator 8, the upper and lower ends of the telltale tube being bent angularly and being passed through the wall of the accumulator in sealed relationship. In other instances (not shown) the accumulator 8 may be provided with a primary vertical column having upper and lower ends communicating with the interior of the accumulator tank 8 so as to act as a liquid level gauge, with a secondary column or telltale tube communicating with the upper and lower portions of the primary column.

As the high pressure ammonia gas from the compressor 1 passes by way of conduit 2 to the internal coil 5 of the condenser 3, the gas is cooled and converted to liquid ammonia, which flows by way of the conduit 15 to a high pressure receiver indicated at 16. The liquid refrigerant is maintained in the receiver under high pressure, the pressures and temperatures being adjusted according to the operating conditions of a given installation.

The high pressure receiver 16 is partially filled with liquid refrigerant, as indicated by the level 17 in FIG. 1. The area within the receiver tank above the liquid level acts as a gas cushion to maintain the liquid level under high pressure to be advanced by way of a conduit 18 to the accumulator 8.

It will be noted, at this point, that the conduit 18, which advances the liquified refrigerant from the receiver 16 to the accumulator 8 draws off the high pressure liquid refrigerant from the bottom portion of the receiver tank, as indicated at 20. The conduit 18 extends from the receiver to the accumulator 8 as indicated at 21 (FIG. 1).

The flow of high pressure liquid refrigerant from the receiver 16 through the conduit 18 is regulated by an electrically operated valve 22 (solenoid valve) which is inserted in supply conduit 18 extending from the receiver 16 to the accumulator. The valve 22 is operated in response to the electrical signals emitted by the sensor or liquid level control device 11 which is mounted upon the tube 13, as noted earlier. The electrically operated solenoid valve 22 is of a commercial design and, as explained later in detail, maintains the liquid level 12 within the accumulator 8 in accordance with the vertical location of the horizontal telltale tube 13 (FIG. 1) or the location of the device 11 with reference to the vertical telltale tube 14 (FIG. 2).

In addition to the electrical control valve 22 (FIG. 1) the conduit 18 also includes a hand-operated valve 23. This valve is of a conventional design and permits the flow of liquid refrigerant from receiver 16 to the accumulator 8 to be regulated or shut off when it becomes necessary to service the system.

The liquified, chilled refrigerant flows from a vertical standpipe 24 (FIG. 1) communicating with the lower end of accumulator 8 and by way of a conduit 25 to the evaporator 26, as indicated by the arrows. The purpose of accumulator 8 is to maintain a supply of liquid refrigerant (liquid level 12) to be advanced by way of the conduit 25 to the evaporator 26 or to several evaporators in a system having a plurality of chilling rooms (not shown). In the present example, the evaporator 26 is illustrated as a housing 27 in which is enclosed an evaporator coil 28. It will be understood, however, that in many instances the evaporator coil 28 is openly mounted within the chilled room.

The conduit 25, leading from the accumulator 8 to the evaporator coil 28, preferably is thermally insulated to prevent external heat exchange, since the refrigerant flowing through conduit 25 has been reduced to a low temperature. The accumulator 8 and other parts of the system which conduct the chilled refrigerant may also be covered with an insulating lagging or pipe covering for the same reason.

In passing through the evaporator coil 28, the expanded liquid refrigerant is advanced through the conduit 30 in the form of a gas, combined with droplets of unexpanded refrigerant, the conduit 30 communicating with the upper portion of accumulator 8 as indicated at 31 (FIG. 1). The unexpanded droplets fall by gravity toward the lower portion of the accumulator 8, as indicated by the arrows 32, while the evaporated refrigerant flows into the upper portion of accumulator 8 as indicated by the arrow 33. The gaseous refrigerant, as indicated by arrow 33, is carried from the accumulator 8 by way of suction line 10 back to compressor 1 for recirculation through the system.

In the example illustrated in FIG. 1, the liquid level control device or sensor, previously indicated at 11, is mounted upon the horizontal telltale tube 13, as indicated earlier. The open end of the tube 13 communicates with the interior of accumulator 8, the outer end of tube 13 being sealed off. As the chilled liquid refrigerant reaches approximately the level indicated at 12, it flows into telltale tube 13, chilling the tube at a rapid rate. Chilling of telltale tube 13 causes the exterior sensor or control device 11 to respond and to close the electrically operated valve 22, so as to shut off the flow of liquid refrigerant from receiver 16 by way of conduit 18 to accumulator 8 so as to maintain the level 12.

As the refrigeration system continues to operate with the electrical valve 22 closed, the liquid level 12 of accumulator 8 begins to fall due to evaporation in evaporator coil 28. When the liquid level 12 drops below the telltale tube 13, the temperature of the telltale tube 13 begins to rise rapidly by operation of an electrical heating element, thereby to speed up the response of sensor 11, as explained later. In response to the rise in temperature the liquid level control device 11 activates the solenoid valve 22, permitting liquid refrigerant to flow from the high pressure receiver 16 by way of conduit 18 to accumulator 8 so as to replenish the liquid refrigerant until it again reaches the liquid level 12.

Liquid Level Control Unit

Referring to FIGS. 3, 4 and 5, the liquid level control device 11, in general, comprises the thermal conduction element, indicated generally at 35, which is clamped to the vertical or horizontal telltale tube 13 or 14 and which supports the control device 11. The control device, generally speaking, consists of the thermostat tube, indicated generally at 36, which is secured to the conduction element 35. Within tube 36 there is fitted a spirally arranged bimetallic thermostat strip, indicated at 37, which closely interfits the inside diameter of the tube, with sufficient clearance to permit movement.

The end of tube 36 supports a cylindrical switch box indicated at 38, which encloses an electrical switch or switches, as indicated generally at 40 (FIGS. 4 and 5). In addition, the control unit 11 includes an electrical heating element or cartridge 41 which is also carried by the conduction element 35. The heating element 41 speeds up temperature recovery of the conduction element 35 as the liquid level of the refrigerant falls below its predetermined level, thereby to increase the responsiveness and precision in the operation of the control device, as explained later. The tubular thermostat 36 and the switch housing 38 may consist of a commercial product with certain modifications to adapt it to the present function. It will be understood, at this point, that the location of the conduction element 35 vertically with reference to the vertical telltale tube 14 controls the level of the liquid refrigerant within the accumulator 8.

Described in detail (FIGS. 3—7), the conduction element 35 comprises a sleeve 42 formed of aluminum or copper in the form of a cylindrical half-section arranged to exactly embrace the outside diameter of the telltale tube 13 or 14. The sleeve half-section 42 is provided with conduction blocks 43 and 44 which are spaced apart from one another, each block having a recess interfitting the outside diameter of the half-section 42 and secured thereto by soldering or brazing as at 45. The conduction blocks 43 and 44 are formed of a thermal conducting material, for example aluminum or copper, as in the sleeve 42.

The conduction element 35 is secured in place upon the telltale tube 13 or 14 by a conventional hose clamp 46. Clamp 46, in general, comprises a metallic strap 47, one end of which includes a sheet metal housing 48 in which there is rotatably mounted an adjustment screw 50 having threads (not shown) which engage the slots 51 formed in the strap 47 (FIGS. 4, 6 and 7). The strap 47 passes around the sleeve half-section 42 and about the telltale tube, thus clamping the conduction element 35 in position.

As explained later, the conduction tube 36 of the liquid level device 11 is mounted on the lower conduction block 44 and the heating element 41 is mounted to the upper conduction block 43. The hose clamp or clamping ring 46 thus supports the liquid level device 11 as a self-contained unit to the horizontal telltale tube 13 or to the vertical telltale tube 14 at a selected position.

The outer ends of the upper and lower conduction blocks 43 and 44 (FIGS. 4, 6 and 7) each include a partially cylindrical recess to receive the heating element or cartridge 41 (upper conduction block 43) and the tube 36 of the thermostat (lower conduction block 44). The heating element or cartridge 41 is removably contained in a capsule or shell 39. The capsule 39 and the tube 36 of the thermostat are secured in their recesses preferably by soldering as at 52 or by other means (not shown). The conduction blocks 43 and 44 are arranged to transfer heat rapidly from the exterior of the telltale tube 13 or 14 between the heater element 41 and thermostat tube 35.

Extending through the spiral thermostat strip 37 is a stem 53 having its outer end anchored as at 54 to the outer end of the spiral strip 37 (FIGS. 4 and 7). The stem 53 passes longitudinally through the spiral strip 37 and its inner end projects into the cylindrical switch housing 38, the end of the stem being journaled as at 55 within a boss 56 extending from the housing. The end portion of stem 53 within the housing includes a switch mounting disc 57 supported by a sleeve 58 fitted over the end portion of stem 53.

The inner end of the spiral thermostat strip 37 is anchored at 60 within a slot formed in boss 56. Accordingly, changes in temperature react upon the spiral thermostat strip 37, causing expansion or contraction so as to impart rotary motion to the stem 53 and to the switch mounting disc 57 which is secured as at 61 to the inner end portion of the stem.

In the present example, a single mercury switch, indicated previously at 40 is indicated at 62 (FIGS. 4 and 5). Switch 62 is adjustably mounted with reference to the disc 57. The mercury switch 62 is supported by an L-shaped bracket 63 centered upon the sleeve 58 of the switch mounting disc 57 and has a horizontal leg which includes a mounting clip 65 which includes flexible legs having curved portions embracing opposite sides of the mercury switch 62. The L-shaped bracket is adjustably secured to disc 57 by a screw and washer 64. The mercury switch 62, in the present example, includes three electrical leads indicated later with reference to the circuit diagram. In general, two of the leads open and close the electrically operated valve 22 (FIG. 1) of the refrigerant supply line 18, while the remaining leads energize the electrical heating element 41 to warm the conduction element 35 at the proper time in response to the rotary movements of the switch mounting disc 57.

It will be understood at this point that the mercury switch 62 is a commercial product including electrodes at opposite ends which interconnect with the several electrical leads, such that the pool of mercury 66 (FIGS. 10 and 11) closes the circuit upon contacting the electrodes. In general, the arrangement is such that upon being rocked to the right, as indicated diagrammatically (FIG. 11-C), the circuit of the electrically operated valve 22 is completed so as to open the valve. On the other hand, upon being tilted to the left (FIG. 11-B), the circuit to the electric heating element 41 is completed.

The electrical leads extending from the mercury switch 62 are highly flexible and extend from the switch to a pair of electrical terminal blocks, indicated at 67 and 68, mounted within the switch housing 38. The blocks 67 and 68 are secured in position within the housing 38 by the screws 70-70 and each block includes electrical terminals 71. The leads from the terminal blocks are connected to the switch leads in a conventional manner.

Electrical Circuit and Operation

As best shown in FIGS. 10—14 the mercury switch 62, in the preferred example, is a commercial product comprising a glass tube 72, with the mercury 66 confined in the tube. The tube includes two pairs of companion switch electrodes or contacts 73 and 74 which are alternately closed as the tube is tilted to those positions indicated at B and C in FIG. 11. In the neutral or level position, shown at A, in FIG. 11, both sets of contacts 73 and 74 are closed in common by the mercury pool 66, as indicated in FIG. 10.

The circuit is energized by the two powerlines 75 and 76 (FIGS. 10 and 12). In the line 76 there is inserted the heating element 41, indicated at a resistor. The line 75 passes into the mercury switch tube to one of the companion contacts 73. The second powerlines 76 also passes into the end of the mercury tube and is interconnected with one of the companion contacts 74. For this purpose, powerline 75 includes an internal branch line 77 running across the tube to its opposite end to one of the companion contacts 75. The electrodes or companion contacts 74 are electrically connected to the line 78 which leads to the coil 80 of the electrically operated or solenoid valve 22. The circuit is completed through the coil 80 by way of the branch line 81 which extends to and is interconnected with the powerline 76, thus completing the circuit.

In the level or overlap position, shown in FIG. 10, it will be noted that the electrical circuit is completed both through the heating element 41 and the solenoid coil 80, thus energizing the heater and opening the solenoid valve 22 to admit liquid refrigerant to the accumulator 8. This position corresponds to the switch position shown diagrammatically at A in FIG. 11.

The diagram B of FIG. 11 represents the position of the mercury switch 62 when the liquid level in the accumulator has reached the cutoff point at which the liquid refrigerant is at the desired level 12, as indicated in FIG. 2. At this point, the spiral thermostat 37, through the conduction element 35 will have been chilled, causing its stem 53 and the switch mounting disc 57 to be rotated toward the left, as indicated. In this position, the companion switch contacts 73 will have been closed by the mercury pool 66 while the opposed companion switch contacts 74 will have been opened. Therefore, in this position, the heating element 47 is energized (lines 75 and 76) while the solenoid coil 80 will have been deenergized (open switch contacts 74). Thus the heating element 41 at this stage is energized and its heat is absorbed by the liquid present in the telltale tube 13 or 14, while the solenoid valve 22 is closed, and will remain closed until the liquid in the accumulator 8 drops below the level 12, previously indicated.

When the liquid within the accumulator drops to a predetermined level below that shown at 12 in FIG. 2, then the spiral thermostat 37 will rotate the switch mounting disc 57 toward the right, as indicated at C, FIG. 11. At this point, it will be seen that the companion contacts 73 will have been opened since the mercury pool now immerses the contacts 74 of line 78 which energizes the coil 80 of the solenoid valve 22 to open the valve. In this position, the heating element 41 is deenergized and the valve 22 remains open until the level 12 of the liquid refrigerant again reaches the cutoff point. As the spiral thermostat 37 is again chilled it rotates the switch mounting disc 57 toward the left, as indicated in diagrams A and B of FIG. 11.

It will be noted that the companion contacts 73 and 74 of the mercury switch provide an overlapping action, as the mercury tube passes across the horizontal position, as shown in diagram A and in FIG. 10. This position, as indicated, closes both sets of contacts 73 and 74 for an interval during the tilting motion of the switch. This action thus energizes both the solenoid coil 80 and the heating element 41 during the transition of the circuit from one extreme position to the opposite (diagrams B and C). This action provides a more rapid and accurate response to the liquid level and insures that the solenoid coil remains energized until liquid has reached the desired level.

It will be understood, that in the left-hand position (FIGS. 10 and 11-A), the mercury switch will remain in neutral position as long as the level of the liquid refrigerant is in proximity to the conduction element 35, even though the heating element 41 is energized. This follows because the liquid refrigerant carries away the applied heat more rapidly than it can flow into the conduction element. On the other hand, as the liquid level drops, then the telltale tube and conduction element become heated because the gas above the liquid level has very little ability to absorb heat. As a consequence, the thermostat strip 37 tilts the mercury switch 40 in the direction of FIG. 11-C to energize (open) the solenoid valve 22 to deenergize the heater 41.

High Level Alarm

In the event that failure occurs in the liquid level control device 11 for some reason or other, it may be desirable, in some systems, to provide an alarm which sends a signal, for example an alarm bell, which indicates that the liquid level 12 within the accumulator has gone above the liquid level control device. Upon operation of the alarm, the operator is alerted to take whatever steps may be necessary, for example, to close certain valves or the like necessary to correct the condition.

As shown diagrammatically in FIG. 2, the high level alarm unit is indicated generally at 82 and is mounted upon the vertical telltale tube 14 in the same manner as the liquid level control device 11. The arrangement is such that if the liquid level 12 should rise approximately to the liquid level indicated at 83, then the alarm will be activated. Generally speaking, the high level alarm 82 includes a switch housing 38 having a thermostat tube 36 which includes the actuating stem 53, together with the switch mounting disc 57.

The high level alarm 82 preferably includes two mercury switches, indicated previously at 40. To distinguish over the mercury switch 62 of the liquid level control device, the high level alarm switches are indicated at 84 and 85 in FIGS. 8, 9 and 13 D and E. As best shown in FIG. 9, the two mercury switches 84 and 85 are mounted within a double spring clip 86, which engages the switches in snap-fitted engagement. The clip 86 and the mercury switches 84 and 85 are adjusted with reference to mounting disc 57 and are locked in adjusted position by a screw 64 as described earlier. The mercury switches 84 and 85 are similar to the mercury switch 62 above described with the exception that each switch has only one set of electrodes or contacts, the sets being located at opposite ends, as viewed in FIG. 8.

The electrical circuit of the alarm system includes the powerlines 87 and 88 including a branch line 90 having a manual control switch. The powerline 87 includes two branch lines 91 and 92 leading to the powerline 88 to complete the circuit. Inserted in the branch line 91 is a pair of electrodes 93 in series with the heating element 94, the circuit being completed through the contacts and heating element to the second powerline 88.

In the branch line 92, there is inserted the electrodes or contacts 95 of an alarm, such as a bell or the like, as indicated at 96, such that the electrodes 95 and signalling device 96 are in series.

It will be understood at this point, that the sets of electrodes 93 and 95 are located at opposite ends of the two mercury switches 84 and 85, such that the switches or electrodes 93 and 95 are opened alternately.

The position of the switch mounting disc 57, shown diagrammatically in FIG. 13-D represents a normal condition in which the heater is energized (normally closed electrodes 93) with the (normally open) electrodes 95 open, as indicated in the electrical diagram (FIG. 14). In the event that the liquid refrigerant rises to the level indicated at 83 (FIG. 2), then the switch mounting disc 57, in response to the thermostat strip 37, tilts toward the right (FIG. 13-E) to close the circuit through the electrodes 95 so as to activate the alarm 96. At the same time the electrodes 93 deenergize the heating element 94.

In the alternate form of the high level alarm, as shown in FIG. 15, there is provided the heating element 97 in the branch line 98 in which is inserted the control electrodes 100 of the mercury switch. In a second branch line 101 there is inserted the electrodes 102 of the second mercury switch in series with the actuating coil 103 of a control relay. In addition, there is provided a third branch line 104 in which there is inserted the contacts 105 of relay coil 103 which are in series with the alarm 106. The circuit operates in the manner described above except that the mercury switch energizes the relay coil 103 instead of energizing the alarm 106 directly.

I claim:

1. A device for regulating the level of liquid refrigerant within a vessel of a refrigeration system comprising:
   a thermal conduction element mounted in contact with a portion of the vessel, whereby the temperature within the vessel is transferred by conduction through the wall of the vessel to the conduction element;
   means for shifting the elevation of the conduction element to select the level of liquid refrigerant within the vessel;
   a tube mounted on the thermal conduction element and in thermal contact therewith;
   a switch housing secured to an end of the tube;
   a switch actuating stem mounted within the tube for rotary motion in forward and reverse directions relative to the tube;
   a spiral thermostat loosely confined within the tube and telescopically disposed about the stem, the spiral thermostat having one end anchored to the stem and having an opposite end anchored relative to the switch housing, whereby changes in the temperature of the conduction element and tube imparts rotary motion to the said spiral thermostat and actuating stem in forward or reverse directions;
   the conduction element including a heating element for raising the temperature of the conduction element and spiral thermostat;
   an electrical switch element in operative connection with the actuating stem arranged to emit an electrical signal in response to the rotary movements of the switch actuating stem in forward or reverse directions;
   an electrically operated control means interconnected with the switch element and arranged to regulate the liquid refrigerant level within the vessel;
   said electrically operated control means arranged to supply liquid refrigerant to the vessel when the switch element emits an electrical signal in response to the rotary movement of the actuating stem in one direction;
   said electrical switch element arranged to energize the electrical heating element when the switch element emits an electrical signal in response to rotary movement of the actuating stem in an opposite direction, thereby to raise the temperature of the conduction element and spiral thermostat.

2. A device for regulating the level of liquid refrigerant within a vessel of a refrigeration system comprising:
   a thermal conduction element mounted in contact with a portion of the vessel, whereby the temperature within the vessel is transferred by conduction through the wall of the vessel to the conduction element;
   means for shifting the elevation of the conduction element to select the level of liquid refrigerant within the vessel;
   a tube mounted on the thermal conduction element and in thermal contact therewith;
   a switch housing secured to an end of the tube;
   a switch actuating stem mounted within the tube for rotary motion in forward and reverse directions relative to the tube;
   a spiral thermostat loosely confined within the tube and telescopically disposed about the stem, the spiral thermostat having one end anchored to the stem and having an opposite end anchored relative to the switch housing, whereby changes in the temperature of the conduction element and tube imparts rotary motion to the said spiral thermostat and actuating stem in forward or reverse directions;
   the conduction element including an electrical heating element for raising the temperature of the conduction element and spiral thermostat;
   a pair of electrical switch elements in operative connection with the rotatable stem of the spiral thermostat and arranged to be opened and closed in response to the rotary motion of the stem as determined by the liquid level of the refrigerant within the vessel of the refrigeration system;
   and an electrical control system interconnecting said switch elements with the electrically operated control means and the electrical heating element and arranged to energize the control means and heating element alternately or simultaneously in response to the movements of the rotary stem of the thermostat.

3. A high level alarm for indicating the highest safe level of liquid refrigerant within a vessel of a refrigeration system which includes a liquid level control device for maintaining the normal liquid level, said high level alarm comprising:
   a thermal conduction element mounted in contact with a portion of the vessel above the normal liquid level control device, whereby the temperature within the vessel above the liquid level control device is transferred by conduction through the wall of the vessel to the conduction element;
   means for shifting the elevation of the thermal conduction element to select the highest safe level of liquid above the level determined by the liquid level control device;
   a tube mounted on the thermal conduction element and in thermal contact therewith;
   a switch housing secured to an end portion of the tube;
   a switch actuating stem rotatably mounted within the tube for rotary motion in forward and reverse directions relative to the tube;
   a spiral thermostat loosely confined within the tube and telescopically disposed about the stem, the thermostat having one end anchored to the stem and having an opposite end anchored relative to the switch housing, whereby changes in the temperature of the conduction element and tube imparts rotary motion to the spiral thermostat and actuating stem in forward and reverse direction;

the conduction element including an electrical heating element for raising the temperature of the conduction element and spiral thermostat;

an electrical switch element in operative connection with the rotary switch actuating stem of the spiral thermostat and arranged to energize the heating element in response to the movement of the rotary switch actuating stem of the thermostat as determined by the highest safe liquid level of the refrigerant within the vessel of the refrigeration system;

and an electrically operated alarm device interconnected with said switch element and arranged to be energized by the switch actuating stem of the thermostat when the liquid refrigerant level within the vessel rises to the highest safe level above the normal liquid level maintained by the control device.

4. A high level alarm for indicating the highest safe level of liquid refrigerant within a vessel of a refrigeration system which includes a liquid level control device for maintaining the normal liquid level, said high level alarm comprising:

a thermal conduction element mounted in contact with a portion of the vessel above the normal liquid level control device, whereby the temperature within the vessel above the liquid level control device is transferred by conduction through the wall of the vessel to the conduction element;

means for shifting the elevation of the thermal conduction element to select the highest safe level of liquid above the level determined by the liquid level control device;

a tube mounted on the thermal conduction element and in thermal contact therewith;

a switch housing secured to an end portion of the tube;

a switch actuating stem rotatably mounted within the tube for rotary motion in forward and reverse directions relative to the tube;

a spiral thermostat loosely confined within the tube and telescopically disposed about the stem, the thermostat having one end anchored to the stem and having an opposite end anchored relative to the switch housing, whereby changes in the temperature of the conduction element and tube imparts rotary motion to the spiral thermostat and actuating stem in forward and reverse directions;

the conduction element including an electrical heating element for raising the temperature of the conduction element and spiral thermostat;

an electrically operated alarm device arranged to be energized when the liquid refrigerant level within the vessel rises to the highest safe level above the normal liquid level maintained by the control device;

a pair of electrical switch elements in operative connection with the rotary switch actuating stem of the spiral thermostat;

and an electrical control system interconnecting said switch elements with the electrically operated alarm device and heating element and arranged to energize the alarm device and heating element alternately or simultaneously in response to the movements of the rotary stem of the thermostat as determined by the highest safe liquid level of the refrigerant within the vessel of the refrigeration system.